United States Patent [19]
Kershner

[11] 4,085,689
[45] Apr. 25, 1978

[54] FIBROUS FILTER INCINERATOR

[76] Inventor: Seymour Kershner, 2902 Henley Rd., Norristown, Pa. 19403

[21] Appl. No.: 701,507

[22] Filed: Jul. 1, 1976

[51] Int. Cl.² .......................... F23G 5/12; C02C 1/12
[52] U.S. Cl. ..................................... 110/252; 210/67; 210/152; 110/203
[58] Field of Search ............... 110/7 R, 7 B, 8 R, 8 C, 110/8 E; 210/67, 152

[56] References Cited
U.S. PATENT DOCUMENTS

| | | | |
|---|---|---|---|
| 3,381,637 | 5/1968 | Farrell, Jr. et al. | 110/8 |
| 3,655,048 | 4/1972 | Pergola | 110/7 X |
| 3,799,074 | 3/1974 | Stribling | 110/8 |

Primary Examiner—Kenneth W. Sprague
Attorney, Agent, or Firm—Margaret Laurence

[57] ABSTRACT

A method and apparatus for the removal and destruction of fibrous materials suspended in a liquid, more particularly for the disintegration and incineration of fibers which enter the wastewater process and builds up in the primary settling tank, aeration basins, clarifiers, and sludge holding zones. The fibrous containing liquid is pumped from a holding tank into an incineration chamber and passed through a filtration grid assembly, depositing the suspended fibers and debris thereon, and returns to the holding tank. After a predetermined time period, the pumping action is terminated. The debris deposited on the grid assembly is then completely incinerated. After the grid assembly has sufficiently cooled water is again pumped into the incineration chamber to wash away the ashes remaining into the holding tank. The ashes settle to the bottom of the holding tank, later to be removed along with the other debris settled on the bottom as is known in the art. The procedure is then repeated.

9 Claims, 2 Drawing Figures

FIG.1
FIG.2
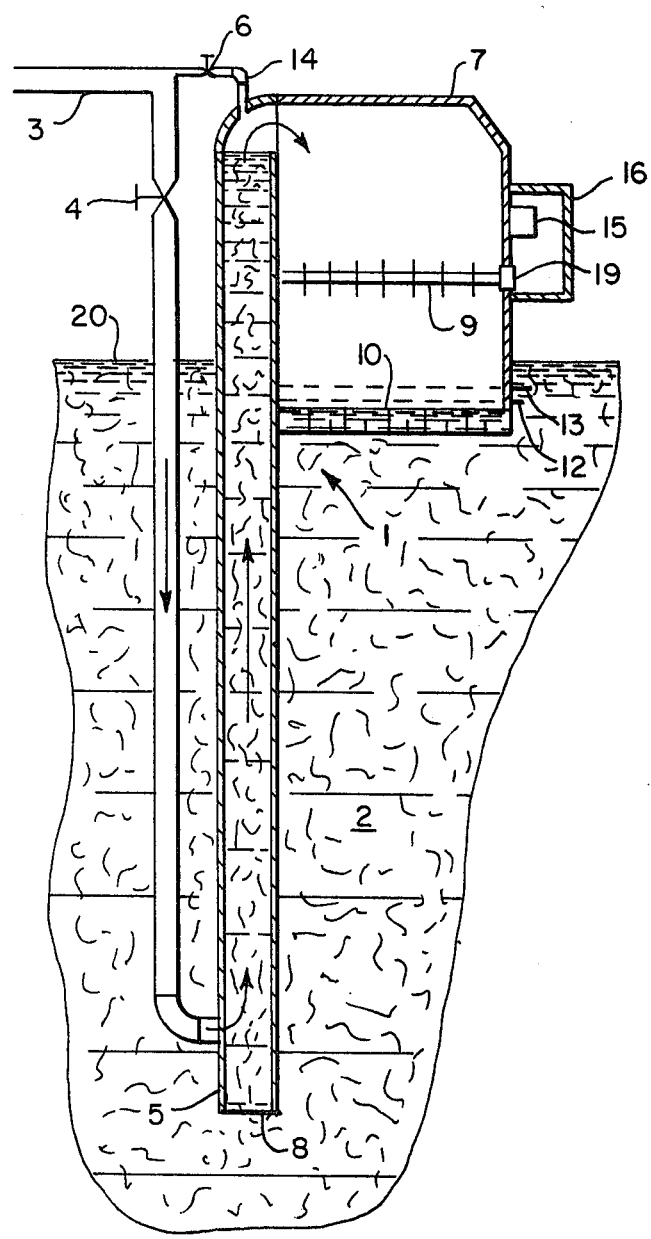
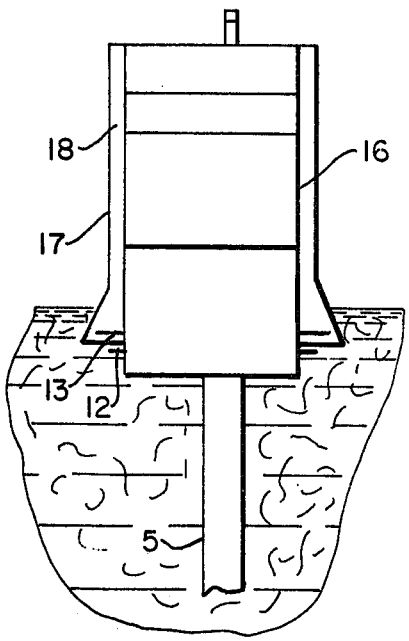

FIBROUS FILTER INCINERATOR

BACKGROUND OF THE INVENTION

This invention relates to the removal and destruction of fibrous materials, organic or inorganic, which enter the wastewater process, as a result of incomplete destruction of materials in the comminuting, and builds up in the primary settling tanks aeration basins, clarifiers and sludge holding zones.

At the present time, comminuting devices reduce the size of particles in the influent wastewater by cutting and shedding various materials found therein and passing them into the wastewater stream. The existence of fibers, independent or agglomerating into rope-like configurations, occurs frequently dispite the most sophisticated comminuting or pre-digesting techniques. The presence of these fibers in the primary settling tanks, aeration basins, clarifiers, and sludge holding zones in municipal and industrial wastewater treatment systems has long presented a serious and costly problem in the operation of these facilities as well as destruction of internal piping. Fibers passing through the comminuting process, either in long form or short form, gather in the subsequent processing tanks, resulting in grave inefficiencies to these processes and greater maintenance cost due to cleaning and/or repair.

Some systems have attempted to minimize this problem by collecting oversize material, prior to comminuting, on screens or other elementary devices. However, this requires that the screens be raked clean or removed and replaced periodically, adding higher capital expenditure and maintenance costs.

In addition to the difficulty in removing fibrous materials, many existing wastewater treatment systems are inadequately prepared for the high volume of fibrous waste introduced into the wastewater as a result of higher population and/or industry.

SUMMARY OF THE INVENTION

The present invention comprises a fully automatic method and apparatus for the continuous removal and incineration of large amounts of fibrous materials, organic or inorganic, which enter the wastewater process and build up in the primary settling tanks, aeration basins, clarifiers, and sludge holding zones.

In accordance with one of the features of the present invention, the fibrous containing liquid is pumped into an incineration chamber wherein the fibrous material is filtered out. The preferred embodiment takes advantage of air supply lines, normally found at most wastewater treatment systems, to economically pump the water into the incineration chamber.

After the filtering process has terminated, the collected debris and fibrous material is heated at a temperature for a length of time sufficient to completely incinerate it. In the preferred embodiment, the fibrous material and debris is heated by incineration rods integrally placed in the filter grid assembly.

Optionally provided is an incineration hood for the filtering and cleaning of objectionable exhaust gases.

When the pumping action is automatically resumed, the fibrous containing liquid entering the incineration will remove any ashes remaining from the incineration step.

DESCRIPTION OF THE DRAWINGS

FIG. 1 is a cross-sectional view of the present invention placed in a holding tank containing a fiber laden liquid.

FIG. 2 is a side view of FIG. 1.

DESCRIPTION OF THE PREFERRED EMBODIMENT

Referring to FIG. 1, numeric designation 1 represents the fibrous filtering incinerator of the present invention. The fibrous filtering incineration 1 is placed into a processing tank containing the fiber laden wastewater 2 to be filtered. The wastewater in the tank having a water level indicated by the numeral 20.

In the filtration mode, air is pumped through air supply pipe 3 and electrically activated control valve 4 into air lift pipe 5. Electrically activated control valve 6 in the filtration mode is in the closed position. Air entering air lift pipe 5 flows upward into filter incineration chamber 7. The rising air creates a pumping action causing a suction at the bottom opening 8 of air lift pipe 5 resulting in suspended fibrous and like debris to be drawn up into and through pipe 5 and spilled into fiber incinerator chamber 7. The opening 8 is placed far enough above the bottom of the tank so that the debris on the bottom is not drawn upward.

In the preferred embodiment an air lift pump is used to pump the fiber laden liquid into the filter incinerator chamber 7. An air lift pump was chosen to take advantage of air supply lines normally found at wastewater treatment plants. However, it can be seen that any known pumping means may be employed.

The wastewater, after entering filter incinerator chamber, falls by gravity through the filter incinerator grid assembly 9 and is returned to the filter incinerator water level 10. The suspended fibrous and like debris is retained on the filter incinerator grid assembly 9. The air entering filter incinerator chamber 7 pressurizes the filter incinerator chamber 7 reducing water level 10 therein to that of the scrubber vents located at the bottom of filter incinerator chamber 7. The excess air entering filter incinerator chamber 7 is released below the water level 10 of the incinerator chamber 7 past baffles 12 and 13 to the atmosphere completing the filtration mode.

After a predetermined filtration period, air lift control valve 4 is activated to its closed state and valve 6 to its open state by timer 15 located in control box 16. This permits the redirection of air from the air supply pipe 1 to the incineration air pipe 14. Air is passed over the collected debris on the filter incineration grid assembly 9 to allow for excess water removal.

After a predetermined period of time for water drainage from the collected fibrous mass, timer 15 activates incinerator rods 19, and integral part of filter incinerator grid assembly 9, for a time and temperature required to destroy, by incineration, the fibrous debris on the filter incineration grid assembly 9. During incineration, the incinerator control valve 6 is in the closed state and discontinues air to the filter incinerator chamber 7. Depending on the contends of the debris and fibrous material collected, it may be necessary to introduce a fresh air supply to enhance the incineration and smoke removal process. Therefore, at some time during incineration, incinerator control valve 6 opens to introduce fresh air. The smoke, displaced by the fresh air, is forced through scrubber vent located at the base of filter incinerator chamber 7 and is released into the surrounding wastewater 2. The entrained smoke is sheared again by baffles 12 and 13 while travelling towards the atmosphere.

In the preferred embodiment, electrically activated incineration rods are used to produce the heat necessary to incinerate the collected debris. However, other means may be used to generate the heat necessary for incineration, e.g., oil or gas burners.

Depending on the material being incinerated and/or the method of incineration, it may be necessary to clean the exiting air. Therefore, optional incinerator hood 17 is provided where necessary. The exhausting air enters hood 17 and passes through air filtering media 18 located therein and is released to the atmosphere.

After the incineration cycle, timer 15 deactivates incinerator rods 19 while maintaining air flow into the filter incineration chamber 7. After the grid assembly 9 has sufficiently cooled, timer 15 initiates the incinerator control valve 6 to return to its normally closed position and the air lift control valve 4 returns to its normally open position reinstituting the filtration cycle.

The initial phase of the filtration cycle supplies the additional function of filter incinerator scrubbing. The scrubbing or self-cleaning created by the flow of wastewater through filter incinerator grid assembly 9, thereby removing the ashes and residue remaining from the incineration process. The incinerator residue returns to the wastewater 2 and settles to the bottom combining with the existing sludge in the sewage treatment process and is removed through known states of the art.

While the methods and forms of apparatus hereindescribed constitute the preferred embodiments of the invention, it is to be understood that the invention is not limited to these precise methods and forms of apparatus, and that changes may be made therein without departing from the scope of the invention which is defined in the appended claims.

I claim:

1. An apparatus for the removal and destruction of fibrous material from a liquid, which comprises:
    (a) an incinerator chamber having an upper portion and a lower portion;
    (b) air lift pump means for pumping the liquid from a source thereof into said upper portion of said incinerator chamber, said pump means comprising
        (i) an elongated air lift pipe means having an open lower end thereof submerged in a source of said liquid and an open uppper end thereof in fluid communication with said upper portion of said incinerator chamber;
        (ii) air supply pipe means having a first branch thereof in fluid communication with said air lift pipe means adjacent said submerged open end thereof and a second branch in fluid communication with said upper portion of said incinerator chamber adjacent said upper open end of said air lift pipe means; and
        (iii) valve means for selectively controlling the flow of air from said air supply pipe means to said first and second branches thereof;
    (c) grid means disposed in said incinerator chamber between said upper and lower portions thereof for filtering the fibrous material from the liquid pumped therein;
    (d) means for incinerating the fibrous material while the material is disposed on said grid means; and
    (e) means for automatically controlling predetermined time periods for (i) passing air through said first branch of said air supply pipe means so as to pump the fibrous liquid through said elongated air lift pipe means and into said incinerator chamber, (ii) passing air through said second branch of said air supply pipe means directly into said incinerator chamber, and (iii) incinerating the fibrous material disposed on said grid means.

2. The apparatus according to claim 1, wherein said means for automatically controlling said predetermined time periods is an electrical timer.

3. The apparatus according to claim 1, wherein said means for incinerating said fibrous material is a gas burner.

4. The apparatus according to claim 1, wherein said means for incinerating fibrous material is an oil burner.

5. The apparatus of claim 1 wherein said means for incinerating the fibrous material comprises electrically activated rods integrally placed in said grid means.

6. The apparatus of claim 5 further comprising incinerator hood means mounted to said upper portion of said incinerator chamber for treating exhaust gases from said incinerator chamber prior to releasing said gases to the atmosphere.

7. The apparatus of claim 5 further comprising means for cleaning the exhaust gases from said incinerator chamber, said cleaning means being placed alongside said incinerator chamber in such a manner as to receive the exhaust gases and said cleaning means including a filter media capable of cleaning the gases.

8. A method for removing and destroying fibrous material contained in a liquid, which comprises the steps of:
    supplying air to an elongated open-ended pipe which has its lower end submerged in a source of fibrous liquid and its upper end in fluid communication with an incineration chamber such that the air passes upwardly through said pipe and thereby pumps the fibrous liquid through said pipe and into said incinerator chamber;
    filtering the fibrous material from the liquid pumped into said incinerator chamber;
    periodically, at predetermined intervals and for a medetermined period of time, discontinuing the flow of air into said pipe and passing air directly into said incinerator chamber to force excess liquid to drain from the filtered fibrous material;
    incinerating the filtered and drained fibrous material;
    cooling said incinerator chamber; and
    removing any ashes remaining from the incinerating step.

9. The method of claim 8 further comprising the step of cleaning the smoke and gas exhausted from said incinerator chamber.

* * * * *